Patented Feb. 15, 1949

2,461,943

UNITED STATES PATENT OFFICE 2,461,943

ALPHA,BETA-UNSATURATED GUANAMINES

Jack Theo Thurston, Cos Cob, Conn., assignor to American Cyanamid Company, New York, N. Y., a corporation of Maine No Drawing. Application August 30, 1941, Serial No. 409,123

13 Claims. (Cl. 260—249.5)

This invention relates to alpha,beta unsaturated guanamines and to methods of preparing them.

Several guanamines have been prepared by the reaction of esters with biguanide. The reaction usually requires elevated temperatures and condensing agents such as sodium, and often the reaction is very slow, which in some cases makes it unsuitable for commercial use.

According to the present invention, I have found that when $\alpha,\beta$ unsaturated esters are used, the reaction proceeds very rapidly and smoothly with good yields in most cases and does not ordinarily require a condensing agent. Apparently, the double bond conjugated with respect to the ester group activates it and causes the reaction to proceed more easily and more rapidly. The exact reason for this activation has not as yet been determined, and the present invention is not intended to be limited by any explanation of the improved results.

The present invention operates effectively with $\alpha,\beta$ unsaturated aliphatic esters and also with similar esters having an aromatic nucleus. The esters may also contain other groups such as negative groups on the $\alpha$ carbon atom which in some cases still further activates the ester group. Examples of such esters are cyanogen substituted esters. In the present invention I do not claim other negatively substituted esters per se, but only in conjunction with unsaturated esters having the conjugated double bond.

The alcohol radical in the esters is not particularly important, the reaction proceeding readily with most of the lower aliphatic alcohol esters such as ethyl, methyl, and the like because of the fact that the alcohol radical does not have any particularly critical character. The cheap esters such as the methyl and ethyl esters are preferred for economic reasons. The invention, however, is not limited to these esters, but includes esters of other alcohols.

The present invention is of particular importance in connection with the production of guanamines in which the amino groups are not substituted. However, the invention is not broadly limited to the production of such guanamines but also includes the production of $\alpha,\beta$ unsaturated guanamines having N substituents such as 4- or 6-N-aryl or N-alkyl or N-heterocyclic groups. The substituted guanamines are prepared by using the 1-substituted biguanides such as phenylbiguanide in place of the biguanide itself. In such cases it is generally desirable to carry out the process in the presence of a metal alkoxide as a condensing agent in order that the reaction may proceed more rapidly to completion. Among the metal alkoxides which we have found to be effective are sodium methoxide, potassium ethoxide, aluminum isopropoxide, and the like.

In general it is desirable to carry out the reaction of the present invention in the presence of a solvent for which lower paraffin alcohols are very suitable. However, in the case of certain $\alpha,\beta$ unsaturated esters such as the crotonates, the double bond is so active that it tends to produce an alkoxy substituted compound by adding on the elements of the alcohol solvent.

It is an advantage of the process of the present invention that the reaction proceeds at room temperature and it is not necessary to apply heat as is the case with the production of guanamines from esters of other acids which do not have an activating group. Whenever heating is required for a considerable time a certain amount of decomposition sets in and therefore better yields can be obtained whenever it is possible to operate the process at a low temperature as is the case with most of the unsaturated guanamines of the present invention.

The invention will be described in detail in conjunction with the following examples which will illustrate typical embodiments of the invention:

Example 1

Methacryloguanamine

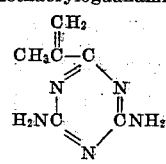

Twenty-five parts of biguanide were dissolved in 160 parts of methanol and 30 parts of methyl methacrylate was added. After standing a few hours a colorless crystalline solid began to crystallize. The product amounting to 20 parts was removed by filtration and after drying melted at 240° C. After recrystallizing from the following sequence of solvents, water, Cellosolve, ethanol and ethyl acetate, and thoroughly drying, the methacryloguanamine melted at 246–247° C. The original methanol filtrate was cooled in ice water and 4 parts of a product melting at 155° C. was obtained. This product was recrystallized from the following solvents, water, ethyl acetate, ethanol and acetone, and after thoroughly drying, it melted at 166° C. The by-product proved to be β-methoxyisobutyroguanamine of the following formula:

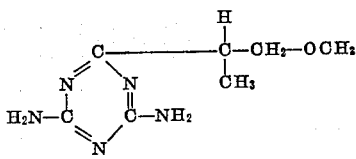

The respective filtrates gave further amounts of material and the total yield of the products was as follows: methacryloguanamine 61% and β-methoxyisobutyroguanamine 20%.

Example 2

Sorboguanamine

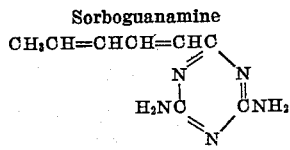

Twenty-two parts of biguanide were dissolved in 150 parts of methanol, the solution filtered and 31.5 parts of methyl sorbate introduced. After standing overnight crystals formed which were recovered by filtration, and the filtrate concentrated to crystallize out further amounts of the guanamine. The crude guanamine was then recrystallized from ethyl acetate, being obtained in the form of light yellow crystals having a melting point of 220° C. The yield was approximately 80%.

Example 3

4-ethyl-2-octenoguanamine

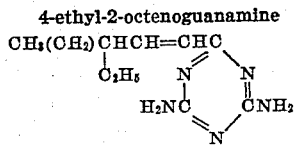

21.2 parts of biguanide were dissolved in 120 parts of methanol and after clarification, 42 parts of methyl-4-ethyl-2-octenoate was introduced. The reaction mixture was refluxed for about eight hours and then cooled in an ice bath which caused crystallization to take place. The product was recovered by filtration, the filtrate concentrated to recover further amounts, and the crude guanamine was then recrystallized from carbon tetrachloride, a mixture of ether-petroleum, ether, and then acetone. A white amorphous product was obtained having a melting point range of 99–101° C. the yield being about 93%.

Example 4

4-ethyl-2-cyano-2-octenoguanamine

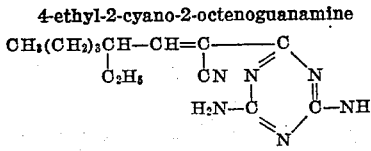

Fifty-six parts of biguanide were dissolved in 330 parts of methanol, clarified by filtration, and 134 parts of methyl-2-cyano-4-ethyl octenoate added. Crystallization began to take place immediately and the exothermic reaction mixture was cooled. After standing overnight, the crystalline product was recovered by filtration. The product was washed with water, alcohol, ethyl acetate, acetone, and ether, and was then in the form of a very insoluble white powder, melting at 323–326° C. with decomposition. The yield of product was about 74% and the analytical data was not conclusive enough to exclude the possibility that this compound might be a pyrimidine of the following formula:

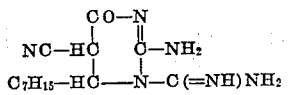

The exact formula of this compound was not conclusively proven.

Example 5

2-methoxybutyroguanamine

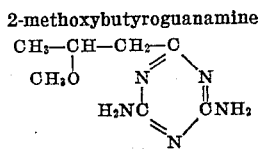

Fifty parts of biguanide were dissolved in 320 parts of methanol, clarified by filtration, and 55 parts of methyl crotonate added. On standing overnight, crystals formed which were removed by filtration. Further amounts were recovered by concentrating the filtrate and recrystallizing from ethyl acetate, methanol, and acetone. The crystals were colorless, melting at 187–188° C. The yield was about 73%.

Example 6

β-ethoxybutyroguanamine

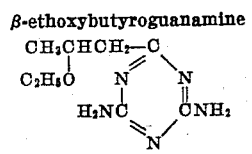

25 parts of biguanide were dissolved in 160 parts of ethanol and the solution clarified by filtration. 30 parts of methyl crotonate were then added and the mixture was allowed to stand until the crystallization was complete. The crystals were removed by filtration and further product was obtained by concentrating the filtrate. The crude material was recrystallized from water, ethyl alcohol and acetone, and the pure product appeared in the form of fine white crystals, having a melting point of 197–198° C. The yield was about 50%.

Example 7

4-nitrocinnamoguanamine

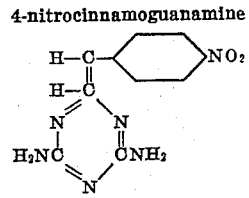

57.5 parts of ethyl-4-nitrocinnamate were dissolved in 80 parts of methyl alcohol and 420 parts of the ethyl ether of ethylene glycol.

0.25 mol. of biguanide was dissolved in 120 parts of methyl alcohol, clarified by filtration, and the filtrate added to the solution of the ester. Crystallization began to take place immediately and in a short time the reaction mixture became filled with crystals. After filtering the product was purified by recrystallization from the ethyl ether

Example 8

2-hydroxycinnamoguanamine

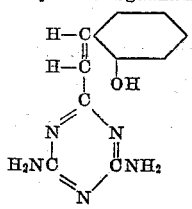

21.2 parts of biguanide were dissolved in 100 parts of methyl alcohol, the solution filtered and then a solution of 29.2 parts of coumarine dissolved in 80 parts of methyl alcohol was added. Reaction took place slowly and was speeded up by the addition of a small amount of sodium methylate. The solution was acidified with acetic acid and evaporated giving a yellow solid which was boiled with water and finally dissolved in the ethyl ether of ethylene glycol. On dilution with an equal volume of naphtha fine light yellow needles, melting at 296° C., were precipitated. The yield was not quite as high in the case of the nitro compound in the preceding example.

Example 9

Cinnamoguanamine

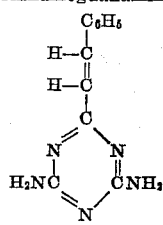

20.2 parts of biguanide were dissolved in 160 parts of methanol, the solution clarified by filtration, and 37 parts of ethyl cinnamate added. After standing about one half hour crystallization began to take place. The crystals were recovered by filtration and recrystallized from butyl alcohol. The final product consisted of small colorless crystals having a melting point of about 276° C., the yield being just under 90%.

Example 10

Furylacryloguanamine

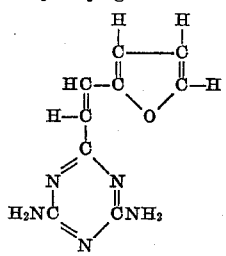

45 parts of biguanide were dissolved in 160 parts of methanol and clarified by filtration. 85 parts of ethyl furylacrylate dissolved in 40 parts of methanol were then added. After standing a short time the reaction mixture deposited crystals and finally the almost solid cake was freed of solvent by filtration. The product was recrystallized from a mixture of 40% ethyl ether of ethylene glycol and 60% water. The purified product was in the form of nearly colorless minute plates having a melting point of 254° C.

In the examples methanol has been used as a solvent in most cases. Other solvents can be used such as ethanol, ethyl ether of ethylene glycol and the like. Methanol is however, preferred because it is cheap and is an excellent solvent for biguanide. This characteristic is the main quality desired in the solvents, as they are used primarily to bring the biguanide into solution with the regular reaction.

I claim:

1. Substituted guanamines having the following general formula:

in which G is a guanamine radical with a free valence on the 2 carbon atom of the triazine ring, Vin is a vinyl group, and R is an aliphatic radical connected to one carbon atom of the vinyl group by carbon to carbon bond, the other carbon atom of the vinyl group being connected to the 2 carbon atom of the guanamine radical by carbon to carbon bond.

2. Guanamines having the following formula:

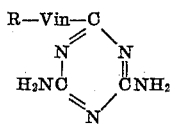

in which Vin is a vinyl group and R is an aliphatic radical connected by carbon to carbon bond to one carbon of the vinyl group, the other carbon of the vinyl group being connected by carbon to carbon bond to the 2 carbon atom of the triazine ring.

3. Guanamines having the following formula:

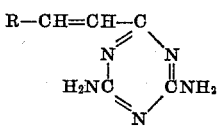

in which R is an aliphatic radical connected to the vinyl group by carbon to carbon bond.

4. Guanamines having the following formula:

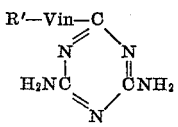

in which Vin is a vinyl group and R' is an aliphatic hydrocarbon radical connected to one carbon atom of the vinyl group, the other carbon atom being connected through carbon to carbon bond with the 2 carbon atom of the triazine ring.

5. 2-Alkylene guanamines having the following formula:

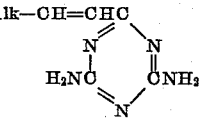

in which Alk is alkyl.

6. Methacryloguanamine having the following formula:

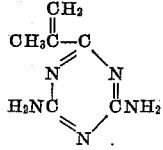

7. Sorboguanamine having the following formula:

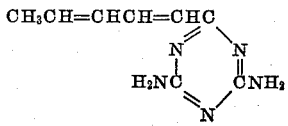

8. A method of preparing guanamines which comprises mixing an α,β-unsaturated carboxylic acid ester and free biguanide and recovering the thus formed guanamines.

9. A method of preparing guanamines which comprises mixing an α,β-unsaturated aliphatic carboxylic acid ester and biguanide and recovering the thus formed guanamines.

10. A method of preparing guanamines which comprises mixing an α,β-unsaturated aryl substituted aliphatic carboxylic acid ester and biguanide and recovering the thus formed guanamines.

11. A method according to claim 8, in which the reaction takes place in an alcoholic solvent.

12. A method according to claim 9, in which the reaction takes place in an alcoholic solvent.

13. A method according to claim 10, in which the reaction takes place in an alcoholic solvent.

JACK THEO THURSTON.

REFERENCES CITED

The following references are of record in the file of this patent:

UNITED STATES PATENTS

| Number | Name | Date |
| --- | --- | --- |
| 2,197,357 | Widmer | Apr. 16, 1940 |

OTHER REFERENCES

Annalen de Chemie, 376; p. 180.
Centralblatt (1907); II, p. 706.
J. für Prakt. Chem. 43 (2) pp. 75–78.
Huminicke Bull. Intern. Acad. Sci. Cracovi (1907), pp. 16–24.
Maier: "Das pyridin un seine derivatives," pp. 31 and 44.